United States Patent [19]
Cho

[11] Patent Number: 5,488,690
[45] Date of Patent: Jan. 30, 1996

[54] COLOR VIDEO PRINTER WHICH ENABLES A PATTERN GENERATION PROCESS WHEN NO SYNCHRONIZING SIGNALS ARE DETECTED

[75] Inventor: Won S. Cho, Kyungki, Rep. of Korea

[73] Assignee: Goldstar Co., Ltd., Seoul, Rep. of Korea

[21] Appl. No.: 992,765

[22] Filed: Dec. 18, 1992

[30] Foreign Application Priority Data

Dec. 20, 1991 [KR] Rep. of Korea .............. 23549/1991

[51] Int. Cl.⁶ .................................................. G03G 15/01
[52] U.S. Cl. ........................... 395/109; 395/115; 395/116
[58] Field of Search ..................................... 395/109, 131; 358/501, 518; 346/157

[56] References Cited

U.S. PATENT DOCUMENTS

| | | | |
|---|---|---|---|
| 5,168,292 | 12/1992 | Kadowaki et al. | 346/157 |
| 5,175,804 | 12/1992 | Wittman | 395/109 |
| 5,179,635 | 1/1993 | Yamazaki et al. | 395/109 |
| 5,265,196 | 11/1993 | Haneda | 395/109 |
| 5,271,096 | 12/1993 | Cook | 395/131 |
| 5,276,779 | 1/1994 | Statt | 395/109 |
| 5,285,296 | 2/1994 | Komooka et al. | 358/518 |
| 5,313,291 | 5/1994 | Appel et al. | 358/501 |

*Primary Examiner*—Mark R. Powell
*Assistant Examiner*—Steven P. Sax

[57] ABSTRACT

A color video printer comprising a first signal processing circuit for processing a video signal inputted therein to be storable and detecting synchronizing signals from the inputted video signal, a memory control unit for outputting read and write signals as memory control signals and generating a predetermined color test signal and predetermined data valid interval signals upon receiving no synchronizing signals from the first signal processing circuit, a pattern generating circuit being enabled by the color test signal for outputting a video pattern signal determined in data valid intervals, a video memory for storing the video signal from the first signal processing circuit or the video pattern signal from the pattern generating circuit in response to the write signal from the memory control unit and outputting the stored video signal or video pattern signal in response to the read signal from the memory control unit, a second signal processing circuit for processing the video signal or the video pattern signal read from the video memory to be displayable, a third signal processing circuit for processing the video signal or the video pattern signal read from the video memory to be printable, and a printing unit for printing a desired video based on an output signal from the third signal processing circuit.

11 Claims, 5 Drawing Sheets

COLOR VIDEO PRINTER WHICH ENABLES A PATTERN GENERATION PROCESS WHEN NO SYNCHRONIZING SIGNALS ARE DETECTED

BACKGROUND OF THE INVENTION

1. Field of the Invention

The present invention relates to a color video printer.

2. Description of the Prior Art

Figure 1:
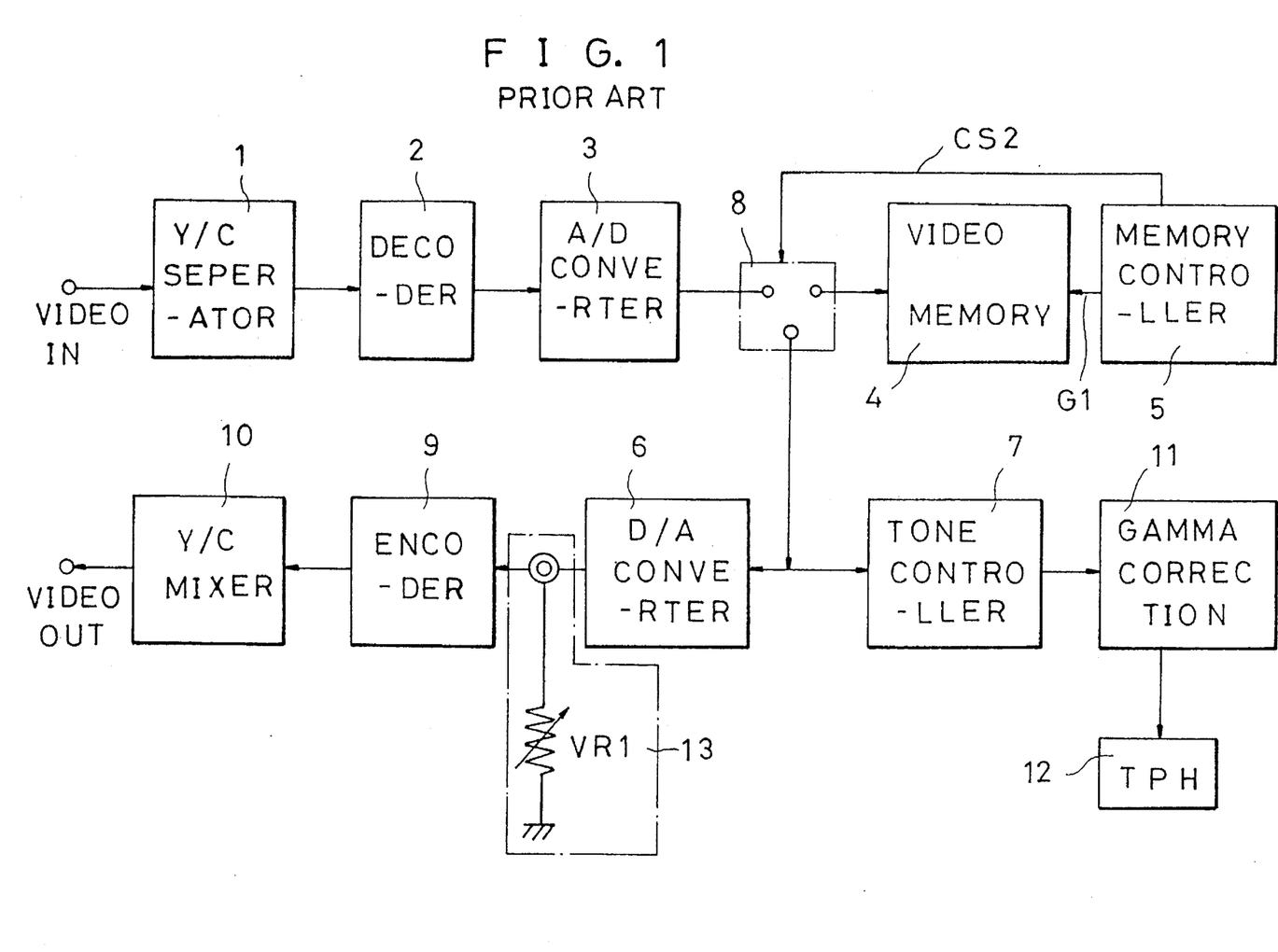
FIG. 1 is a block diagram of a conventional color video printer.

Referring to FIG. 1, there is shown a block diagram of a conventional video printer. As shown in this figure, the conventional color video printer comprises a luminance signal/color signal (Y/C) separator 1 for separating a luminance signal Y and a color signal C from a video signal inputted therein, a decoder 2 for detecting red (R), green (G) and blue (B) signals and vertical and horizontal synchronizing signals V. and H. from the color signal C from the Y/C separator 1, an analog/digital (A/D) converter 3 for converting the separated R, G and B signals from the decoder 2 into digital signals, a video memory 4 responsive to a memory control signal CS1 for writing the digital R, G and B signals from the A/D converter 3 therein in the unit of frame and reading the stored R, G and B signals therefrom, a memory controller 5 for outputting the memory control signal CS1 to the video memory 4 for the read and write operations of the video memory 4 according to a user's selection and a switching control signal CS2, a digital/analog (D/A) converter 6 for converting the digital R, G and B signals read from the video memory 4 into analog signals, a tone control let 7 for converting the digital R, G and B signals read from the video memory 4 into print three-color signals or magenta (m), cyan (c) and yellow (y) signals, a switch 8 responsive to the switching control signal CS2 from the memory controller 5 for transferring the R, G and B signals from the video memory 4 to the D/A converter 6 and the tone controller 7 in the read operation or transferring the digital R, G and B signals from the A/D converter 3 to the video memory 4 in the write operation, an encoder 9 for converting the analog R, G and B signals from the D/A converter 6 into the luminance and color signals Y and C, a Y/C mixer 10 for mixing the luminance and color signals Y and C from the encoder 9 and outputting the mixed signal to a display unit (not shown) such as a monitor for displaying a desired video based on the mixed signal, a gamma correction circuit 11 for correcting distortions of the m, y and c signals from the tone controller 7, a thermal printing head 12 for printing the desired video based on output signals from the gamma correction circuit 11, and a video adjustment circuit 13 for adjusting levels of the analog R, G and B signals from the D/A converter 6 to adjust brightness, tint and contrast of the video to be displayed.

The operation of the color video printer with the construction as mentioned above with reference to FIG. 1 will hereinafter be described.

Upon input of a video signal, the Y/C separator 1 separates the luminance signal Y and the color signal C from the inputted video signal and the decoder 2 detects the R, G and B signals and the vertical and horizontal synchronizing signals V. and H. from the color signal C from the Y/C separator 1. The R, G and B signals as video three-color signals from the decoder 2 are converted by the A/D converter 3 into the digital R, G and B signals, which are then applied to the video memory 4 through the switch 8 in response to the switching control signal CS2 from the memory controller 5. The video memory 4 writes the digital R, G and B signals from the A/D converter 3 therein in the unit of frame in response to the memory control signal CS1 for the write operation, applied from the memory controller 5. At this time, upon receiving the vertical and horizontal synchronizing signals V. and H. from the decoder 2, the memory controller 5 recognizes that the video signal has been inputted and thus outputs the memory control signal CS1 for the write operation to the video memory 4. The memory controller 5 also outputs the switching control signal CS2 to the switch 8 to connect the output of the A/D converter 3 to the input of the video memory 4.

On the contrary, upon receiving no vertical and horizontal synchronizing signals V. and H. from the decoder 2, the memory controller 5 recognizes that no video signal has been inputted and thus outputs the memory control signal CS1 for the read operation to the video memory 4. The memory controller 5 also outputs the switching control signal CS2 to the switch 8 to connect the output of the video memory 4 to the input of the D/A converter 6 and the input of the tone controller 7.

Accordingly, the digital R, G and B signals stored in the unit of frame in the video memory 4 are read by the memory control signal CS1 for the read operation from the memory controller 5 and are applied to the D/A converter 6 and the tone controller 7 through the switch 8. The switch 8 acts to connect the output of the video memory 4 to the input of the tone controller 7 and the input of the D/A converter 6 in response to the switching control signal CS2 from the memory controller 5.

In the tone controller 7, the digital R, G and B signals from the video memory 4 are converted into the print three-color signals or the magenta (m), cyan (c) and yellow (y) signals, the distortions of which are corrected in the gamma correction circuit 11. The thermal printing head 12 prints the desired video based on the distortion-corrected m, c and y signals from the gamma correction circuit 11.

On the other hand, in the D/A converter 6, the digital R, G and B signals from the video memory 4 are converted into the analog R, G and B signals, which are then converted into the luminance and color signals Y and C in the encoder 9. The Y/C mixer 10 mixes the luminance and color signals Y and C from the encoder 9 and outputs the mixed signal to the display unit such as the monitor.

The video adjustment circuit 13, as shown in FIG. 1, has a variable resistor VR1 for adjusting the levels of the analog R, G and B signals from the D/A converter 6, being applied to the encoder 9, so as to optimize the states (i.e., brightness, tint and contrast) of the video to be displayed.

However, the conventional color video printer has a disadvantage, in that a black color appears on the whole surface of a print paper in the print operation or on the whole surface of a screen in the display operation since any signal is not stored in the video memory 4 when no video signal has been inputted or at the initial state. This results in a bad view. Also, if unnecessary data is stored in the video memory 4 in the case where no video signal has been inputted, an unrelated video is printed or displayed. Moreover, since the color states of the video cannot be tested at the initial state before display through the display unit, an accurate color adjustment for the video is difficult in the display operation. Furthermore, because the color states of the video cannot be tested at the initial state before print through the thermal printing head, an accurate color adjustment for the video is difficult in the print operation.

SUMMARY OF THE INVENTION

Therefore, the present invention has been made in view of the above problems, and it is an object of the present invention to provide a color video printer for appropriately adjusting colors of a video by testing states of the colors before a normal operation.

It is another object of the present invention to provide a color video printer for generating a predetermined video pattern for color test when no video signal has been inputted.

In accordance with the present invention, the above objects can be accomplished by a provision of a color video printer comprising: first signal processing means for processing a video signal inputted therein to be storable and detecting synchronizing signals from the inputted video signal; memory control means for outputting read and write signals as memory control signals and generating a predetermined color test signal and predetermined data valid interval signals upon receiving no synchronizing signals from said first signal processing means; pattern generating means being enabled by the color test signal from said memory control means for outputting a video pattern signal determined in data valid intervals; video memory means for storing the video signal from said first signal processing means or the video pattern signal from said pattern generating means in response to the write signal from said memory control means and outputting the stored video signal or video pattern signal in response to the read signal from said memory control means; second signal processing means for processing the video signal or the video pattern signal read from said video memory means to be displayable; third signal processing means for processing the video signal or the video pattern signal read from said video memory means to be printable; and printing means for printing a desired video based on an output signal from said third signal processing means.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 2:
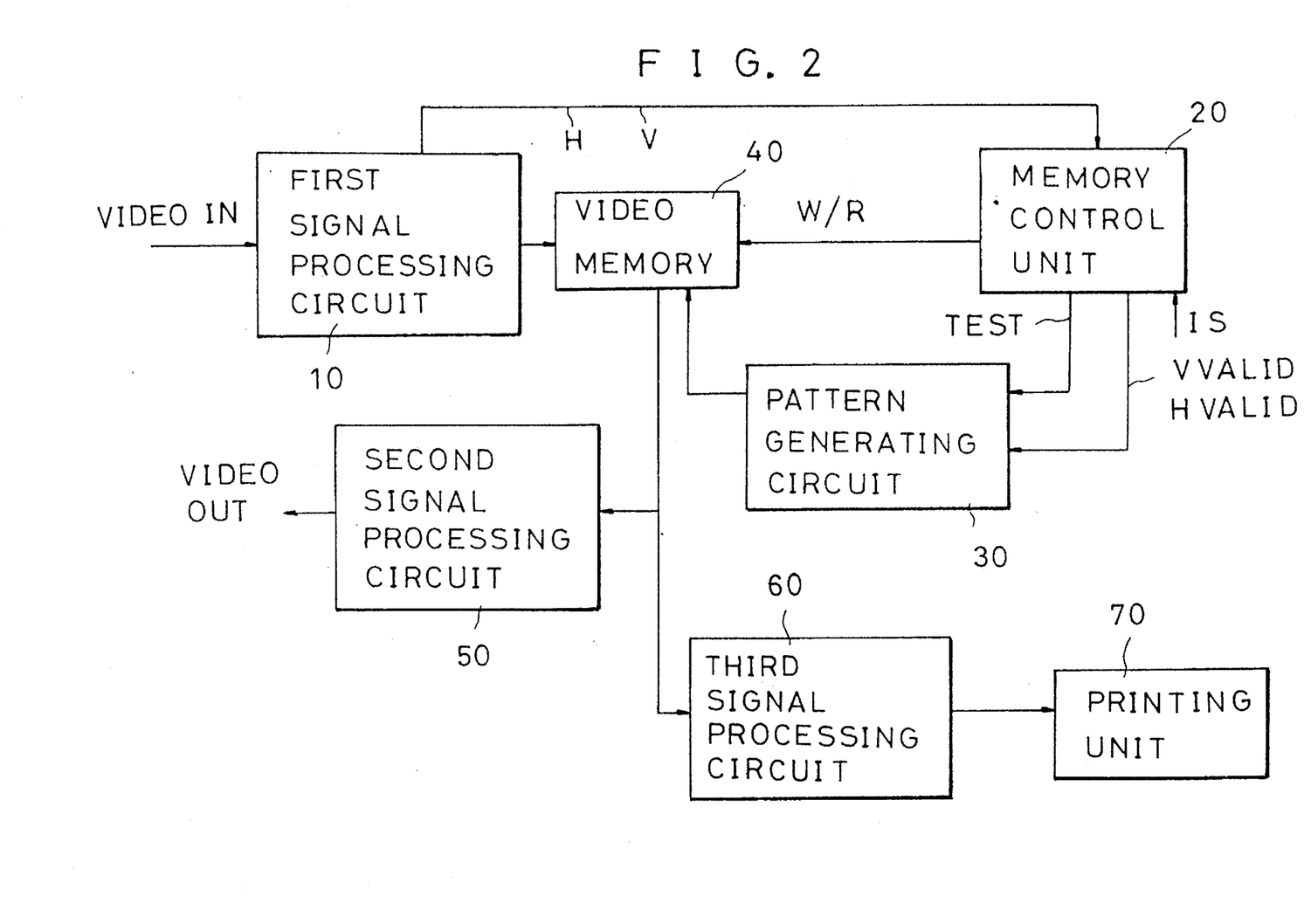
FIG. 2 is a schematic block diagram of a color video printer in accordance with the present invention.

Referring to FIG. 2, there is shown a schematic block diagram of a color video printer in accordance with the present invention. As shown in this drawing, the color video printer of the present invention comprises a first signal processing circuit 10 for processing a video signal inputted therein to be storable and detecting vertical and horizontal synchronizing signals V. and H. from the inputted video signal, a memory control unit 20 for generating a predetermined color test signal TEST and predetermined data valid interval signals upon receiving no synchronizing signals from the first signal processing circuit 10, the data valid interval signals being 512 horizontal data valid interval signals HVALID and 2 vertical data valid interval signals VVALID, and outputting a read signal R normal times and a write signal W upon receiving a memory command signal according to a user's selection, a pattern generating circuit 30 for outputting a video pattern signal determined in data valid intervals in accordance with the color test signal TEST and the data valid interval signals HVALID and VVALID from the memory control unit 20, a video memory 40 for storing the video signal from the first signal processing circuit 10 or the video pattern signal from the pattern generating circuit 30 in response to the write signal W from the memory control unit 20 and outputting the stored video signal or video pattern signal in response to the read signal R from the memory control unit 20, a second signal processing circuit 50 for processing the video signal or the video pattern signal from the video memory 40 to be displayable, a third signal processing circuit 60 for processing the video signal or the video pattern signal from the video memory 40 to be printable, and a printing unit 70 for printing a desired video based on an output signal from the third signal processing circuit 60.

Figure 3:
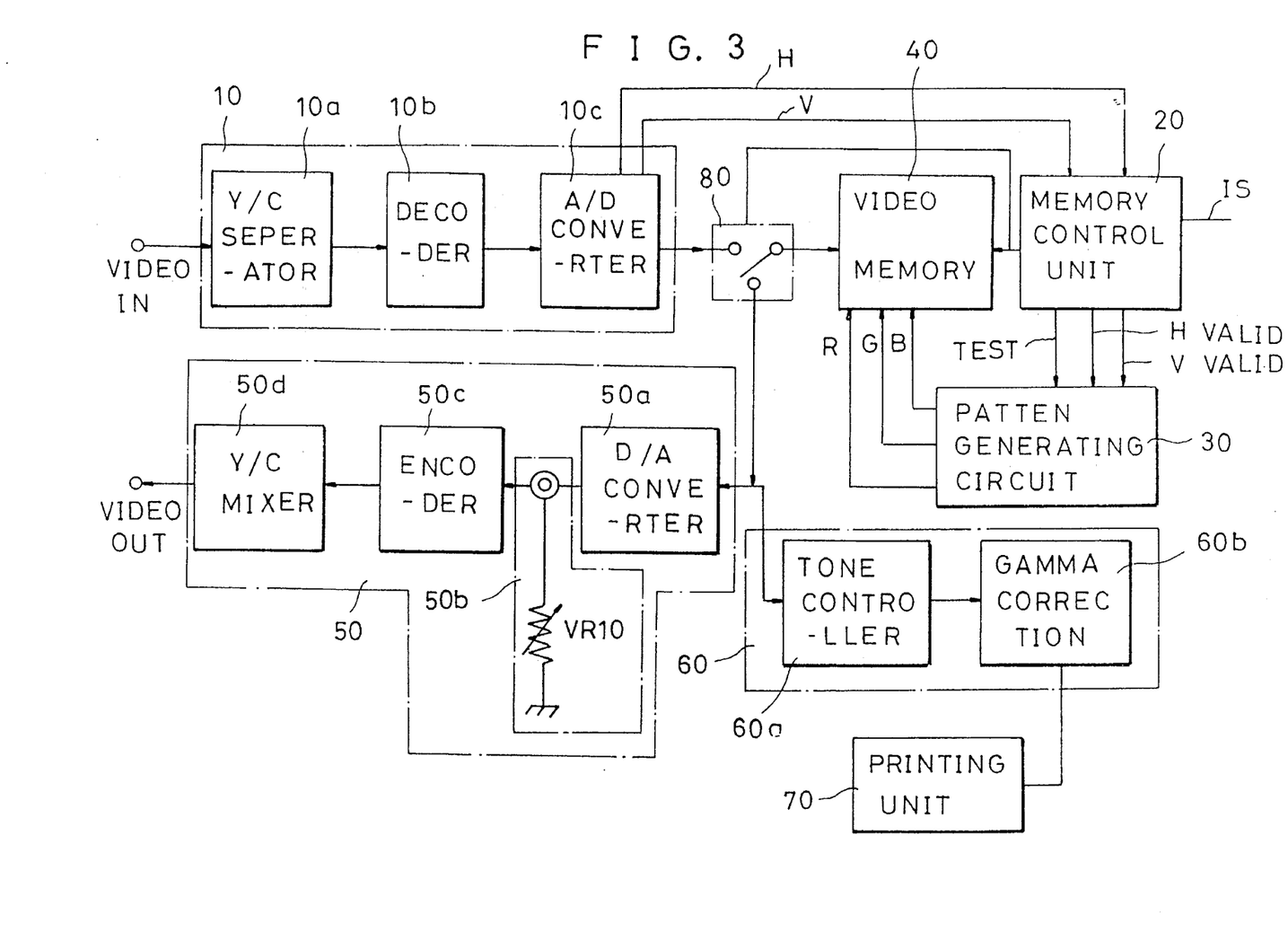
FIG. 3 is a detailed block diagram of the color video printer in FIG. 2 in accordance with an embodiment of the present invention.

Referring to FIG. 3 there is shown a detailed block diagram of the color video printer in FIG. 2 in accordance with an embodiment of the present invention. The first signal processing circuit 10 includes a Y/C separator 10a for separating luminance and color signals Y and C from the inputted video signal, a decoder lob for detecting red (R), green (G) and blue (B) signals and the vertical and horizontal synchronizing signals V. and H. from the color signal C from the Y/C separator 10a, and an analog/digital (A/D) converter 10c for converting the separated R, G and B signals from the decoder 10b into digital signals.

The memory control unit 20 may, typically, include a microcomputer.

The-video memory 40 may, typically, be a frame memory.

The second signal processing circuit 50 includes a digital/analog (D/A) converter 50a for converting the digital R, G and B signals read from the video memory 40 into analog signals, a video adjustment circuit 50b for adjusting levels of the analog R, G and B signals from the D/A converter 50a to adjust states of the video to be displayed, an encoder 50c for converting the analog R, G and B signals from the video adjustment circuit 50b into the luminance and color signals Y and C, and a Y/C mixer 50d for mixing the luminance and color signals Y and C from the encoder 50c and outputting the mixed signal as a composite video signal.

The third signal processing circuit 60 includes a tone controller 60a for converting the digital R, G and B signals read from the video memory 40 into print three-color signals or magenta (m), cyan (c) and yellow (y) signals, and a gamma correction circuit 60b for correcting distortions of the m, y and c signals from the tone controller 60a.

The printing unit 70 may, typically, be a thermal printing head (TPH).

A switch 80 is further provided to connect the output of the first signal processing circuit 10 to the input of the video memory 40 in response to the write signal W from the memory control unit 20 and to connect the output of the video memory 40 to the inputs of the second and third signal processing circuits 50 and 60 in response to the read signal R from the memory control unit 20.

The video adjustment circuit 50b includes a variable resistor VR10.

Figure 4:
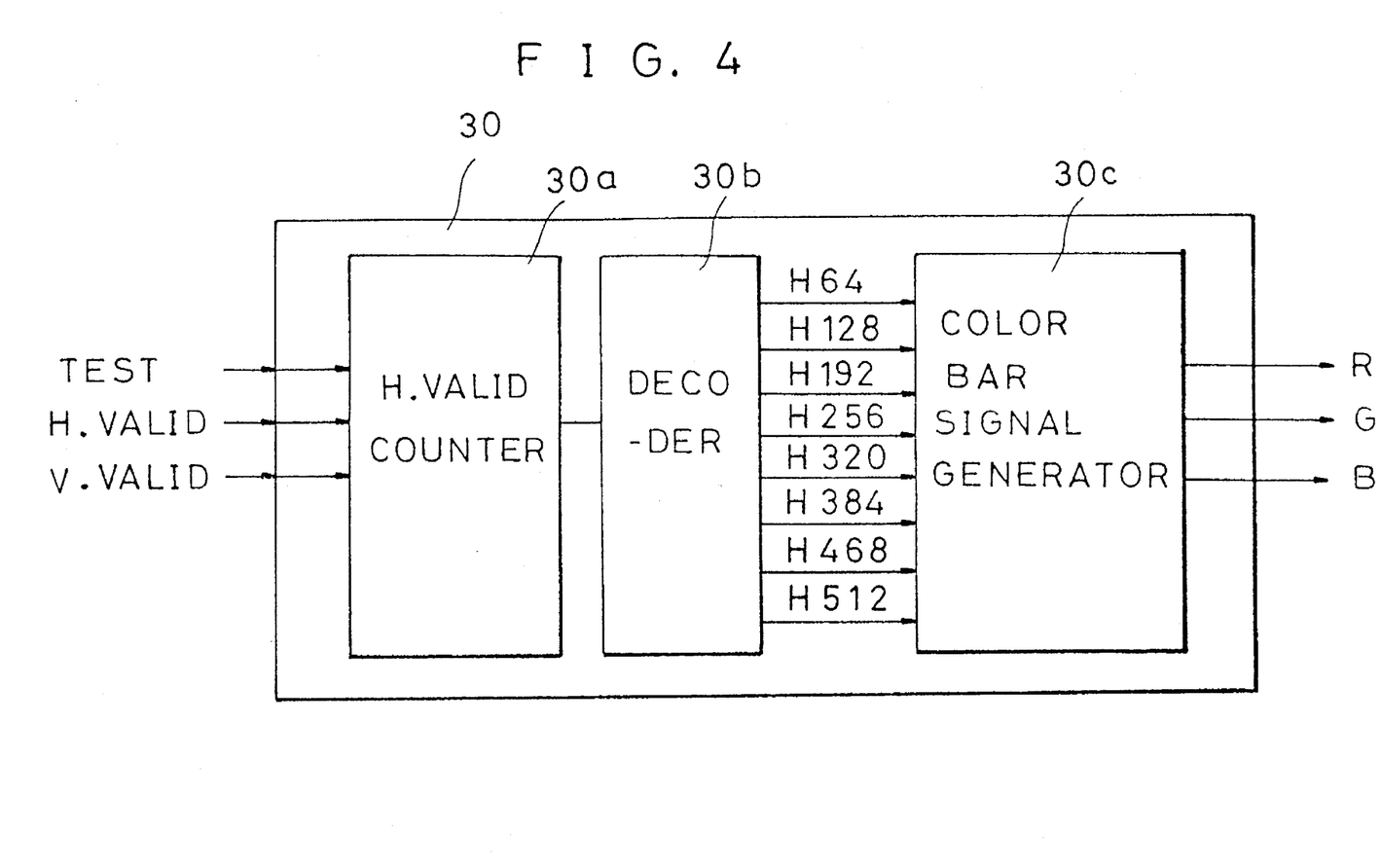
FIG. 4 is a detailed block diagram of a pattern generating circuit in the color video printer in accordance with the embodiment of the present invention.

Referring to FIG. 4, there is shown a detailed block diagram of the pattern generating circuit 30 in accordance with the embodiment of the present invention. As shown in this figure, the pattern generating circuit 30 includes a counter 30a being enabled by the color test signal TEST from the memory control unit 20 for counting the 512 horizontal data valid interval signals HVALID from the memory control unit 20, a decoder 30b for decoding a count number of the counter 30a to output corresponding predetermined decoding information (H64, H128, H192, H256, H320, H384, H468 and H512) whenever the count number of the counter 30a is in accord with a predetermined number (64 in the preferred embodiment of the present invention), and a color bar signal generator 30c for outputting color bar signals corresponding to the decoding information from the decoder 30b as the R, G and B signals.

The operation of the color video printer with the above-mentioned construction in accordance with the present invention will hereinafter be described in detail with reference to FIGS. 2 to 5.

For the purpose of a better understanding of the present invention, a description will first be made with respect to scanning lines in a television receiver or a monitor.

In a NTSC system which is broadly used presently, there are employed 512 scanning lines per one frame. The horizontal synchronizing signal is placed on an end portion of each the lines for a distinction among the lines. In the monitor or the television receiver, one video picture is referred to as one frame consisting of two fields. The vertical synchronizing signal is placed on an end portion of each the fields. Data are placed on portions other than the horizontal and vertical synchronizing signal portions in the scanning lines and fields, the data portions being referred to as the horizontal data valid intervals and the vertical data valid intervals, respectively. For this reason, the number of the horizontal data valid intervals is 512 per one frame. In accordance with the preferred embodiment of the present invention, in the case where no video signal has been inputted, the 512 horizontal data valid intervals are partitioned into 8 zones and bars of colors different every each the 8 zones are displayed or printed. Now, the operation of the color video printer of the present invention will be described in the two cases where a video signal has been inputted and not inputted.

* The case where a video signal has been inputted*

Upon input of a video signal, in the first signal processing circuit 10, the Y/C separator 10a separates the luminance signal Y and the color signal C from the inputted video signal and the decoder l0b detects the R, G and B signals and the vertical and horizontal synchronizing signals V. and H. from the color signal C from the Y/C separator 10a. The R, G and B signals from the decoder lob are converted by the A/D converter 10c into the digital R, G and B signals. At this time, upon receiving a memory command signal IS from the user, the memory control unit 20 outputs the write signal W. Also, since the memory control unit 20 receives the vertical and horizontal synchronizing signals V. and H. from the decoder 10b, it does not generate the color test signal TEST and the vertical and horizontal data valid interval signals VVALID and HVALID. As a result, the pattern generating circuit 30 is disabled because the color test signal TEST from the memory control unit 20 is not applied thereto.

The switch acts to connect the output of the A/D converter 10c to the input of the video memory 40 in response to the write signal W from the memory control unit 20.

Accordingly, the video memory 40 stores the digital R, G and B signals from the A/D converter 10c in response to the write signal W from the memory control unit 20. Once the video signal of one frame has been stored in the video memory 40, the memory control unit 20 outputs the read signal R, as usual, again. In response to the read signal R from the memory control unit 20, the switch 80 acts to connect the output of the video memory 40 to the inputs of the D/A converter 50a and the tone controller 60a. As a result, the digital R, G and B signals read from the video memory 40 are applied to the D/A converter 50a and the tone controller 60a through the switch 80. In the D/A converter 50a, the digital R, G and B signals are converted into the analog R, G and B signals, the levels of which are adjusted by the video adjustment circuit 50b under the control of the user, so that the states (i.e., brightness, tint and contrast) of the video to be displayed are adjusted.

The level-adjusted analog R, G and B signals from the video adjustment circuit 50b are converted into the luminance and color signals Y and C in the encoder 50c. The Y/C mixer 50d mixes the luminance and color signals Y and C from the encoder 50c and outputs the mixed signal as the composite video signal to a display unit such as the monitor or the television receiver.

On the other hand, in the tone controller 60a in the third signal processing circuit 60, the digital R, G and B signals from the video memory 40 are converted into the printable magenta (m), cyan (c) and yellow (y) signals, the distortions of which are corrected in the gamma correction circuit 60b. The printing unit or the thermal printing head 70 prints the desired video based on the distortion-corrected m, c and y signals from the gamma correction circuit 60b on a print paper.

As stated above, the operation of the color video printer of the present invention in the case where the video signal has been inputted is substantially the same as that of the prior art.

* The case where no video signal has been inputted*

First, upon receiving the memory command signal IS from the user, the memory control unit 20 outputs the write signal W. At this time, the decoder 10b in the first signal processing circuit 10 does not output the vertical and horizontal synchronizing signals V. and H. because of reception of no video signal. As a result, since the memory control unit 20 receives no vertical and horizontal synchronizing signals V. and H. from the decoder 10b, it recognizes that no video signal has been inputted and thus outputs the color test signal TEST, the horizontal data valid interval signals HVALID determined for the scanning lines and the vertical data valid interval signals VVALID determined for the fields.

As a result, in the pattern generating circuit 30 in FIG. 4, the counter 30a is enabled by the color test signal TEST from the memory control unit 20, to count the horizontal data valid interval signals HVALID by one. When the count number of the counter 30a reaches 64, the decoder 30b decodes the count number 64 and thus outputs the predetermined decoding information H64 corresponding to the count number 64. Upon receiving the decoding information H64 from the decoder 30b, the color bar signal generator 30c outputs the R, G and B signals corresponding to white bars, the R, G and B signals all being high. As a result, the white bars are displayed from the first scanning line to the 64th scanning line on the screen.

Next, if the count number of the counter 30a is in accord with 128, the decoder 30b decodes the count number 128 and thus outputs the predetermined decoding information H128 corresponding to the count number 128. Upon receiving the decoding information H128 from the decoder 30b, the color bar signal generator 30c outputs the R, G and B signals corresponding to yellow bars, the R and G signals being high and the B signal being low.

Thereafter, in this manner, the decoder 30b outputs successively the predetermined decoding information H192, H256, H320, H384, H468 and H512 and the color bar signal generator 30c outputs successively the color bar signals corresponding to the decoding information H192, H256, H320, H384, H468 and H512 from the decoder 30b, until the counter 30a counts 512 corresponding to the total number of the scanning lines.

The 8 color bar signals as mentioned above constitute a video pattern of one frame, which is stored in the video memory 40. In response to the write signal W from the memory control unit 20, the video memory 40 stores the 8 color bar signals from the color bar signal generator 30c in the pattern generating circuit 30 in the input order.

Upon completion of the write operation of the video memory 40, the memory control unit 20 outputs, again, the read signal R enabling the switch 80 to connect the output of the video memory 40 to the inputs of the D/A converter 50a and the tone controller 60a. As a result, in response to the read signal R from the memory control unit 20, the 8 color bar signals, corresponding to the video pattern, read from the video memory 40 are applied to the D/A converter 50a and the tone controller 60a.

Then, the video pattern is displayed and printed in the same manner as that in the case where the video signal has been inputted, as mentioned previously, and a description thereof will thus be omitted.

Figures 5A, 5B:
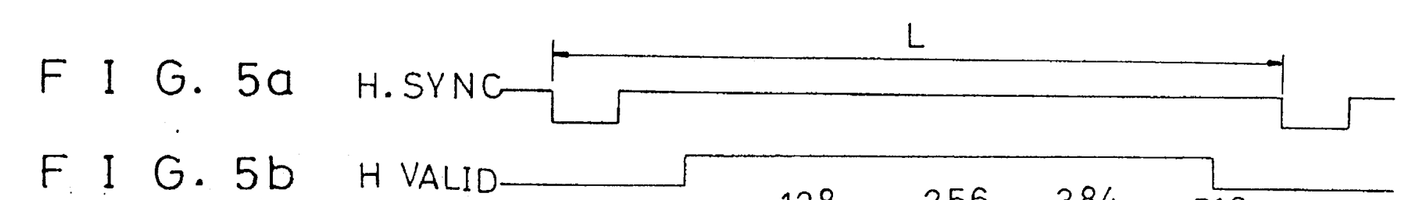
FIGS. 5a to 5f are waveform diagrams of signals from respective components in the pattern generating circuit in FIG. 4.

Referring to FIGS. 5a to 5f, there are shown waveform diagrams of the signals from the respective components in the pattern generating circuit 30 in FIG. 4. FIG. 5a shows the horizontal synchronizing signal H. which is applied from the decoder 10b to the memory control unit 20. Provided that the horizontal synchronizing signal H. is not applied to the memory control unit 20, the predetermined horizontal data valid interval signals HVALID are generated from the memory control unit 20 as shown in FIG. 5b. In other words, each of the horizontal data valid interval signals HVALID is generated in the interval of each of the scanning lines L in which the horizontal synchronizing signal H. is not present.

Figure 5C:
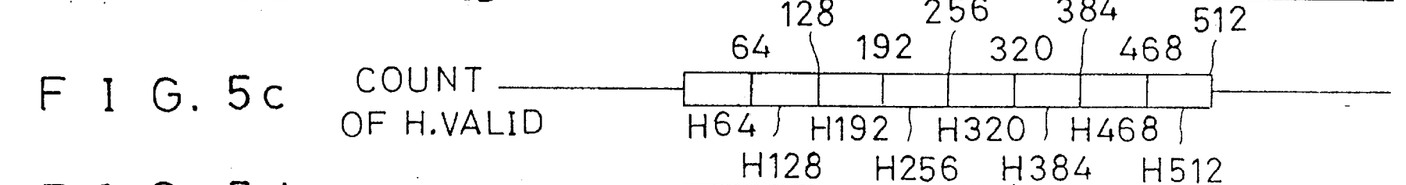
Figures 5D, 5E, 5F:
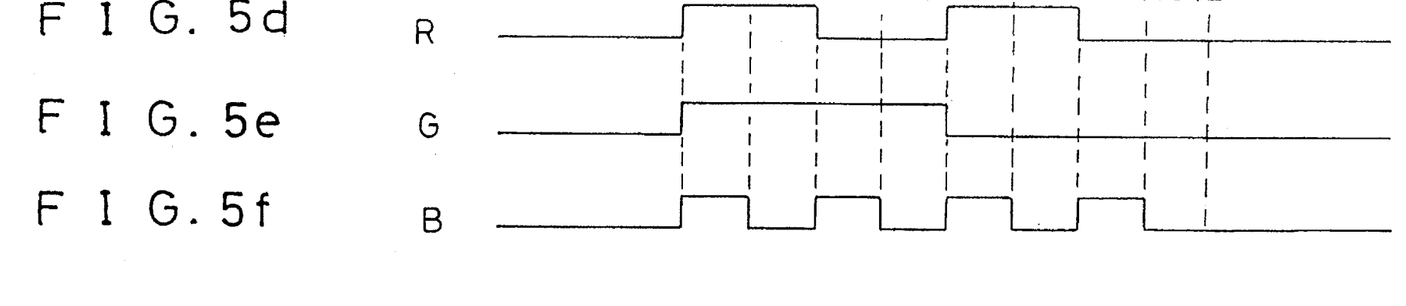

The counter 30a in FIG. 4 counts the number of the horizontal data valid interval signals HVALID from the memory control unit 20 in the unit of zone as shown in FIG. 5c. Whenever the counter 30a counts the predetermined number (i.e., 64) by one time of a total of 8 times, the color bar signal generator 30c outputs the R, G and C signals as shown in FIGS. 5d to 5f.

As hereinbefore described, according to the present invention, the following advantages can be provided:

First, in the case where any signal is not stored in the video memory when no video signal has been inputted or at the initial state, a black color does not appear on the whole surface of the print paper in the print operation or on the whole surface of the screen in the display operation and an unrelated video is not printed and displayed. Instead, the desired video pattern consisting of the plurality of color bars is printed and displayed. This has effect of providing a good view.

Second, since the desired video pattern consisting of the plurality of color bars is printed and displayed in the case where no video signal has been inputted at the initial state or the normal state, the color video printer allows the user to check the color states of the video being outputted from the color video printer and, furthermore, to adjust the colors at the optimum states.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A color video printer comprising:

first signal processing means for processing a video signal inputted therein to be storable and detecting synchronizing signals from the inputted video signal;

memory control means for outputting read and write signals as memory control signals and generating a predetermined color test control signal upon receiving no synchronizing signals from said first signal processing means;

pattern generating means being enabled by the color test control signal from said memory control means for outputting a video pattern signal;

video memory means for storing the video signal from said first signal processing means or the video pattern signal from said pattern generating means in response to the write signal from said memory control means and outputting the stored video signal or video pattern signal in response to the read signal from said memory control means;

second signal processing means for processing the video signal or the video pattern signal read from said video memory means to be displayable;

third signal processing means for processing the video signal or the video pattern signal read from said video memory means to be printable; and printing means for printing a desired video based on an output signal from said third signal processing means.

2. A color video printer as set forth in claim 1, wherein said first signal processing means includes:

a luminance signal/color signal separator for separating luminance and color signals from the inputted video signal;

a decoder for detecting red, green and blue signals as video three-color signals and the synchronizing signals from the color signal from said luminance signal/color signal separator; and an analog/digital converter for converting the separated red, green and blue signals from said decoder into digital signals.

3. A color video printer as set forth in claim 1, wherein said video memory means is a frame memory.

4. A color video printer as set forth in claim 1, wherein said second signal processing means includes:

a digital/analog converter for converting the video signal or the video pattern signal read from said video memory means into an analog signal;

an encoder for converting an output signal from said digital/analog converter into luminance and color signals; and a luminance signal/color signal mixer for mixing the luminance and color signals from said encoder and outputting the mixed signal as a composite video signal.

5. A color video printer as set forth in claim 4, wherein said second signal processing means further includes:

a video adjustment circuit for adjusting a level of the output signal from said digital/analog converter under a control of the user, to adjust a state of a video to be displayed, and outputting the level-adjusted signal to said encoder.

6. A color video printer as set forth in claim 5, wherein said video adjustment circuit includes a variable resistor.

7. A color video printer as set forth in claim 1, wherein said third signal processing means includes:

a tone controller for converting the video signal or the video pattern signal read from said video memory means into magenta, cyan and yellow signals as print three-color signals; and a gamma correction circuit for correcting distortions of the magenta, cyan and yellow signals from said tone controller.

8. A color video printer as set forth in claim 1, wherein said printing means is a thermal printing head.

9. A color video printer as set forth in claim 1, wherein said pattern generating means includes:

a counter being enabled by the color test control signal from said memory control means for counting data valid interval signals from said memory control means;

a decoder for decoding a count number of said counter to output corresponding predetermined decoding information whenever the count number of said counter is in accord with a predetermined number; and a color bar signal generator for outputting color bar signals corresponding to the decoding information from said decoder.

10. A color video printer as set forth in claim 9, wherein said predetermined number is 64.

11. A color video printer as set forth in claim 1, further comprising:

a switch for connecting the output of said first signal processing means to the input of said video memory means in response to the write signal from said memory control means and for connecting the output of said video memory means to the inputs of said second and third signal processing means in response to the read signal from said memory control means.

* * * * *